(12) United States Patent
Hu et al.

(10) Patent No.: US 11,843,865 B2
(45) Date of Patent: Dec. 12, 2023

(54) METHOD AND DEVICE FOR GENERATING VEHICLE PANORAMIC SURROUND VIEW IMAGE

(71) Applicant: CHANGSHA INTELLIGENT DRIVING INSTITUTE CORP., LTD, Changsha (CN)

(72) Inventors: Rongdong Hu, Changsha (CN); Bo Wan, Changsha (CN); Meihua Peng, Changsha (CN); Kaibin Yang, Changsha (CN); Sijuan Wang, Changsha (CN)

(73) Assignee: CHANGSHA INTELLIGENT DRIVING INSTITUTE CORP., LTD, Changsha (CN)

( * ) Notice: Subject to any disclaimer, the term of this patent is extended or adjusted under 35 U.S.C. 154(b) by 0 days.

(21) Appl. No.: 17/786,312

(22) PCT Filed: Dec. 16, 2020

(86) PCT No.: PCT/CN2020/136729
§ 371 (c)(1),
(2) Date: Jun. 16, 2022

(87) PCT Pub. No.: WO2021/121251
PCT Pub. Date: Jun. 24, 2021

(65) Prior Publication Data
US 2023/0023046 A1 Jan. 26, 2023

(30) Foreign Application Priority Data
Dec. 16, 2019 (CN) .......................... 201911289818.9

(51) Int. Cl.
*G06V 10/44* (2022.01)
*H04N 23/698* (2023.01)

(52) U.S. Cl.
CPC ......... *H04N 23/698* (2023.01); *G06V 10/443* (2022.01)

(58) Field of Classification Search
None
See application file for complete search history.

(56) References Cited

U.S. PATENT DOCUMENTS

2015/0153170 A1* 6/2015 Gonzalez ............... G05D 1/027
701/300
2015/0286878 A1 10/2015 Molin et al.
(Continued)

FOREIGN PATENT DOCUMENTS

| CN | 102629372 A | 8/2012 |
| CN | 106799993 A | 6/2017 |

(Continued)

OTHER PUBLICATIONS

K.M.Goh et al., "Implementation and Application of Orientation Correction on SIFT and SURF Matching," Int. J. Advance. Soft Comput. Appl., vol. 5, No. 3, Nov. 2013, ISSN 2074-8523; SCRG Publication, 16 pages.

*Primary Examiner* — Eileen M Adams
(74) *Attorney, Agent, or Firm* — Seed IP Law Group LLP

(57) ABSTRACT

The present disclosure relates to a method for generating a panoramic surround view image of a vehicle, comprising: acquiring actual original images of external environment of a first part and a second part of the vehicle hinged to each other; processing the actual original images to obtain respective actual independent surround view images of the first part and the second part; obtaining coordinates of respective hinge points of the first part and the second part; determining matched feature point pairs in the actual independent surround view images of the first part and the second pan; calculating a distance between two points in each matched feature point pair accordingly, and taking matched feature (Continued)

point pairs with the distance less than a preset first threshold as a successfully matched feature point pairs; and taking a rotation angle corresponding to the maximum number of the successfully matched feature point pairs as a candidate rotation angle of the first part relative to the second part. The present disclosure further provides a device for generating a panoramic surround view image of a vehicle and an intelligent vehicle.

13 Claims, 6 Drawing Sheets

(56) References Cited

U.S. PATENT DOCUMENTS

| | | | |
|---|---|---|---|
| 2015/0329048 A1* | 11/2015 | Wang | B60R 1/00 348/148 |
| 2016/0191795 A1 | 6/2016 | Han et al. | |
| 2017/0277197 A1* | 9/2017 | Liao | G06T 7/20 |

FOREIGN PATENT DOCUMENTS

| | | |
|---|---|---|
| CN | 107424120 A | 12/2017 |
| CN | 108263283 A | 7/2018 |
| CN | 109883433 A | 6/2019 |
| CN | 110719411 A | 1/2020 |
| CN | 110751598 A | 2/2020 |

\* cited by examiner

METHOD AND DEVICE FOR GENERATING VEHICLE PANORAMIC SURROUND VIEW IMAGE

TECHNICAL FIELD

The present disclosure relates generally to the field of intelligent driving, and more particularly, to a method and device for generating a panoramic surround view image of a vehicle.

BACKGROUND

At present, many panoramic surround view systems on the market are suitable for vehicles in which relative position of a camera is fixed during driving, that is, suitable for integrated vehicles. However, this kind of system is not suitable for a split or combined vehicle (including a front of the vehicle and one or more carriages hinged therewith) in which multiple parts are hinged to each other. The reason is the positional relationship between the different pans hinged to each other changes dynamically when the split vehicle is running, especially when it is turning. The existing panoramic surround view solution cannot perfectly cope with this situation, and there will be display blind spots and ghosting and other issues, which could pose a security risk.

Existing methods for calibrating and stitching a panoramic surround view system generally obtain rotation angles between different parts of the vehicle by installing an angle sensor device to stitch the panoramic surround view images. However, this method requires provision of sensors besides the cameras, causing problems such as high cost and difficulty in installation and maintenance.

SUMMARY

In view of the technical problems existing in the prior art, the present disclosure provides a method for generating a panoramic surround view image of a vehicle, comprising: acquiring actual original images of external environment of a first part and a second part of the vehicle hinged to each other; processing the actual original images to obtain respective actual independent surround view images of the first part and the second pan; obtaining coordinates of respective hinge points of the first part and the second part; determining matched feature point pairs in the actual independent surround view images of the first part and the second part; overlapping the respective hinge points in the actual independent surround view images of the first part and the second part, and assuming that the independent surround view image of the first part is rotated relative to the independent surround view image of the second part or assuming that matched feature points of the first part are rotated relative to matched feature points of the second part, calculating a distance between two points in each matched feature point pair accordingly, and taking a matched feature point pairs with the distance less than a preset first threshold as a successfully matched feature point pair; determining an actual rotation angle of the first part relative to the second part at least based on number of the successfully matched feature point pairs; and obtaining a panoramic surround view image of the vehicle after fusing the respective actual independent surround view images of the first part and the second part according to the coordinates of the hinge points and the actual rotation angle.

Particularly, the step of determining an actual rotation angle of the first part relative to the second part at least based on number of the successfully matched feature point pairs comprises taking an angle corresponding to the maximum number of the successfully matched feature point pairs as the actual rotation angle between the first part and the second part.

Particularly, the step of determining an actual rotation angle of the first part relative to the second part at least based on number of the successfully matched feature point pairs comprises: taking an angle corresponding to the maximum number of the successfully matched feature point pairs as a candidate rotation angle between the first part and the second part; determining coordinates of the successfully matched feature point pairs based on the candidate rotation angle; calculating a distance between two points in each successfully matched feature point pair and summing the distances; and taking a rotation angle corresponding to the minimum summation result as the actual rotation angle of the first part relative to the second part.

Particularly, the step of determining coordinates of the successfully matched feature point pairs based on the candidate rotation angle comprises obtaining a candidate rotation-translation matrix based on the coordinates of the hinge points of the first part and the second part and the candidate rotation angle; and the step of calculating a distance between two points in each successfully matched feature point pair comprises calculating a distance between two points in the successfully matched feature point pair based on coordinates of the matched feature point pair and the candidate rotation-translation matrix.

Particularly, the step of processing the actual original images to obtain respective actual independent surround view images of the first part and the second part comprises: correcting distortion on the actual original images of the external environment of the first part and the second part; projecting the corrected images into the geodetic coordinates system to generate a bird's-eye view of the first part and the second part; detecting and matching respectively internal feature points in overlap-ping areas of the respective bird's-eye views of the first part and the second part, and then fixing and stitching to obtain respective fixed mosaics of the first part and the second part; and cropping the respective fixed mosaics of the first part and the second part to obtain the respective actual independent surround view images of the first part and the second part.

Particularly, the step of determining matched feature point pairs in the actual independent surround view images of the first part and the second part comprises: feature point detection, for detecting natural feature points in the overlapping area of the actual independent surround view images of the first part and the second part and generating descriptors; feature point matching, for generating matched feature point pairs by a matching algorithm at least based on the descriptors, wherein the matching algorithm comprises ORB, SURF or SIFT algorithm; and feature point screening, for screening out mismatched feature point pairs by a screening algorithm, wherein the screening algorithm comprises RANSAC or GMS algorithm.

Particularly, the method further comprises a method of obtaining the coordinates of the respective hinge points of the first part and the second part that comprises: obtaining multiple pairs of training independent surround view images of the first part and the second part; detecting and matching feature points in terms of each pair of the training independent surround view images; calculating a plurality of corresponding training rotation-translation matrices based on the matched feature point pairs in each pair of the training independent surround view images, and then calculating a plurality of corresponding training rotation angles between the first part and the second part; determining a plurality of corresponding training translation vectors between the first part and the second part at least based on coordinates of the matched feature points in the multiple pairs of training independent surround view images as well as the plurality of training rotation angles; and calculating to obtain the co-ordinates of the hinge points of the first part and the second part according to the coordinates of feature points of the multiple pairs of independent surround view images, the plurality of training rotation angles and the plurality of training translation vectors.

Particularly, the method of obtaining the coordinates of the respective hinge points of the first part and the second part further comprises: taking at least two of the plurality of training rotation angles as one set, and calculating to obtain coordinates of candidate hinge points corresponding to the set based on the training translation vectors; and sorting all the coordinates of candidate hinge points, and taking a median of the sorting result as the coordinates of the hinge points of the first part and the second part; wherein a difference between at least two training rotation angles of each set is greater than a preset angle threshold.

The present disclosure also relates to a device for generating a panoramic surround view image of a vehicle, the device comprising: an original image acquisition unit configured to acquire actual or training original images of external environment of a first part and a second part of the vehicle hinged to each other; an independent surround view image acquisition unit, which is coupled to the original image acquisition unit, configured to stitch the actual or training original images of the first part and the second part into respective actual or training independent surround view images; and a panoramic surround view image acquisition unit coupled to a hinge point calibration unit and the independent surround view image acquisition unit, comprising: a feature point detecting and matching module, which is coupled to the independent surround view image acquisition unit, configured to receive the actual independent surround view images of the first part and the second part, and detect and match feature points therein; an actual rotation angle calculation module, which is coupled to the feature point detecting and matching module, con-figured to obtain coordinates of hinge points of the first part and the second part, and overlap the hinge points of the first part and the second part in the independent surround view images, and, assuming that the independent surround view image of the first part is rotated relative to the independent surround view image of the second part or that the matched feature points of the first part are rotated relative to the matched feature points of the second part, calculate a distance between two points in each matched feature point pair to take the matched feature point pairs with the distance less than a preset first threshold as a successfully matched feature point pairs, and determine an actual rotation angle of the first part relative to the second part at least based on number of the successfully matched feature point pairs; and a panoramic surround view image generation module, which is coupled to the actual rotation angle calculation module, configured to obtain a panoramic surround view image of the vehicle after fusing the respective actual independent surround view images of the first part and the second part according to the coordinates of the hinge points and the actual rotation angle.

Particularly, the step of the actual rotation angle calculation module configured to determine the actual rotation angle of the first part relative to the second part at least based on the number of the successfully matched feature point pairs comprises, taking an angle corresponding to the maximum number of the successfully matched feature point pairs as the actual rotation angle between the first part and the second part.

Particularly, the step of the actual rotation angle calculation module configured to determine the actual rotation angle of the first part relative to the second part at least based on the number of the successfully matched feature point pairs comprises, taking an angle corresponding to the maximum number of the successfully matched feature point pairs as a candidate rotation angle between the first part and the second part, determining coordinates of the successfully matched feature point pair based on the candidate rotation angle, calculating a distance between two points in each successfully matched feature point pair and summing the distances, and taking a rotation angle corresponding to the minimum summation result as the actual rotation angle of the first part relative to the second part.

Particularly, the device further comprises the hinge point calibration unit coupled to the independent surround view image acquisition unit, which comprises: a feature point detecting and matching module, which is coupled to the independent surround view image acquisition unit, configured to receive multiple pairs of training independent surround view images of the first part and second part, and to detect and match feature points of each pair of training independent surround view images of the first part and the second part; a training rotation angle calculation module, which is coupled to the feature point detecting and matching module, configured to obtain a plurality of training rotation-translation matrices between the feature points of the first part and the second part in each pair of training independent surround view images based on the coordinates of the matched feature points, and correspondingly obtain a plurality of training rotation angles between the first part and the second part in each pair of independent surround view images; a training translation vector acquisition module, which is coupled to the training rotation angle calculation module, configured to determine a plurality of corresponding training translation vectors of each pair of training independent surround view images according to coordinates of the matched feature points of each pair of training independent surround view images and the plurality of training rotation angles; and a hinge point coordinates determination module, which is coupled to the translation vector acquisition module and the training rotation angle calculation module, configured to determine the coordinates of the hinge points of the first part and the second part of the vehicle according to the coordinates of the matched feature points of the multiple pairs of training independent surround view images, the plurality of training rotation angles and the corresponding plurality of training translation vectors.

The present disclosure further relates to an intelligent vehicle, comprising: a first part and a second part hinged to each other; a processor, and a memory coupled to the processor; and a sensor unit configured to capture actual or training original images of the first part and the second part; wherein the processor is configured to implement the method as described above.

BRIEF DESCRIPTION OF THE DRAWINGS

Preferred embodiments of the present disclosure will be described hereinafter with further details with reference to the accompanying drawings, wherein.

DETAILED DESCRIPTION

Figure 1:
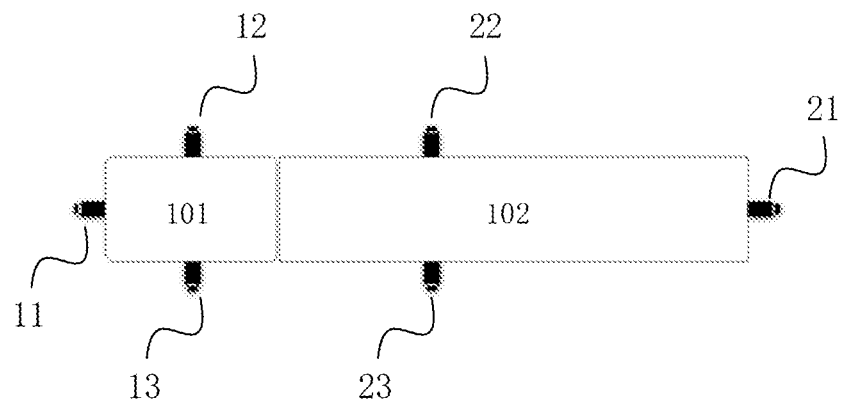
FIG. 1 is a schematic diagram of a vehicle according to an embodiment of the present disclosure.

In order to state the object, technical solutions and advantages of the embodiments of the present disclosure more clearly, the technical solutions in the embodiments of the present disclosure will be described clearly and completely below with reference to the drawings of the embodiments of the present disclosure. Obviously, the described embodiments are only part of the embodiments of the present disclosure, rather than the overall. Based on the embodiments in the present disclosure, all other embodiments obtained by those ordinarily skilled in the art without creative efforts shall fall within the protection scope of the present disclosure.

In the following detailed description, reference may be made to the accompanying drawings, which are considered as a part of the present disclosure to illustrate specific embodiments of the present disclosure. In the drawings, similar reference signs describe substantially similar components in the different drawings. The specific embodiments of the present disclosure are described in sufficient detail below to enable those ordinarily skilled in the art to implement the technical solutions of the present disclosure. It should be appreciated that other embodiments may also be utilized or structural, logical or electrical changes may be made to the embodiments of the present disclosure.

The present disclosure provides a method for generating a panoramic surround view image of a vehicle, wherein the vehicle comprises at least two parts that are hinged together, such as a semi-trailer. In some embodiments, the vehicle comprises multiple parts that are hinged with each other, such as trains, subways, or the like, to which the method described in the present disclosure is also applicable.

Structure of the vehicle applied with the method will be described briefly below by taking a vehicle comprising two parts hinged to each other as an example. FIG. 1 is a schematic diagram of a vehicle according to an embodiment of the present disclosure. In this embodiment, it is assumed that the left side in the figure is the forward direction of the vehicle. The vehicle shown in FIG. 1 includes a first part 101 and a second part 102, which are connected by a hinge. In the hinged state, hinge points of the first part 101 and the second part 102 coincide with each other. Cameras 11, 12 and 13 are respectively disposed on the front, right and left sides of the first part 101. Cameras 21, 22, and 23 are provided respectively on the rear, right, and left sides of the second part 102. In this embodiment, the cameras may be wide-angle cameras of 180° or other angles, and the arrangement of the cameras is only an example. In some embodiments, the position and amount of the cameras could be set in other ways.

In some embodiments, the vehicle may further include a camera synchronization module (not shown) to synchronize data among the various cameras.

For a vehicle including a plurality of parts hinged to each other, hinge points are irreplaceable with respect to other features. The reason is that no matter how state of motion of the two hinged parts of the vehicle changes, the respective hinge points of the two parts of the vehicle should always coincide in actual situations. Taking such a point relatively stable in position as a reference point can not only make the calculation result more accurate and generated images closer to the actual scene, but also reduce extra computational power loss caused by relative motion and thereby improve the overall work efficiency. Therefore, coordinates of the respective hinge points of the hinged parts are calculated first, and then used in the subsequent image stitching process based on the known coincidence relationship, by which a more realistic and stable panoramic surround view image of the vehicle can be obtained.

Figure 2A:
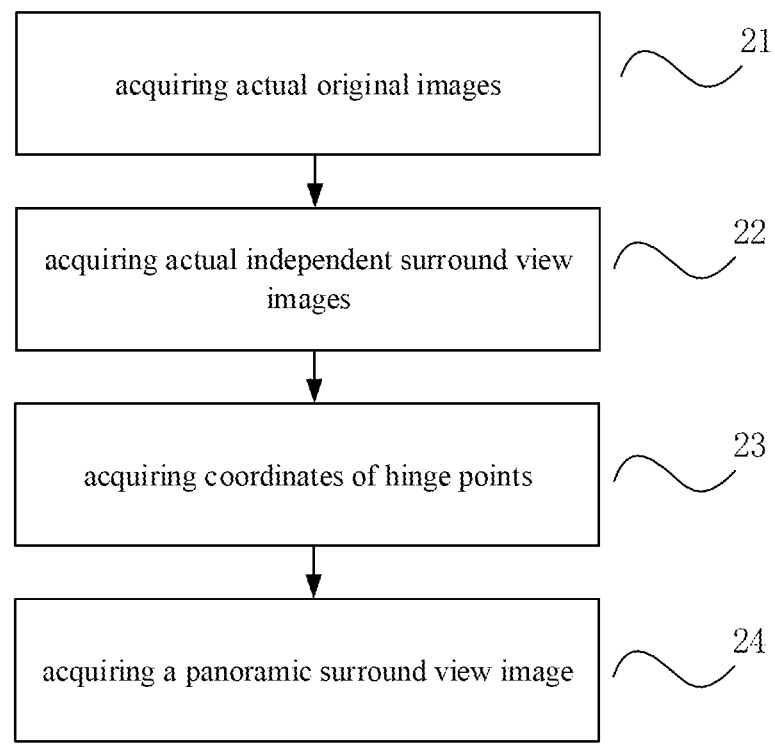
FIG. 2A is an overall flow diagram of a method for generating a panoramic surround view image of a vehicle according to an embodiment of the present disclosure.
Figure 2B:
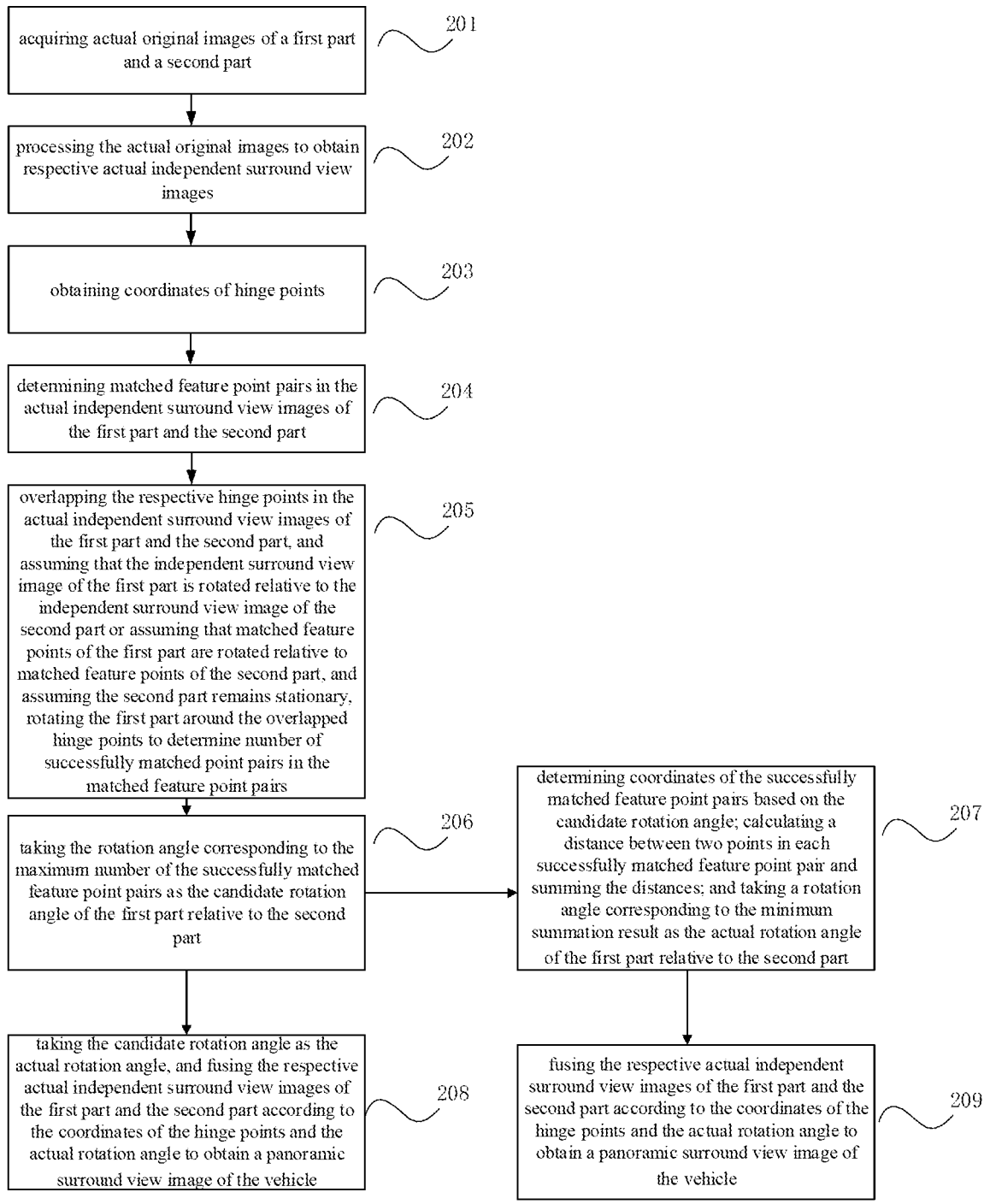
FIG. 2B is a specific flow diagram of a method for generating a panoramic surround view image of a vehicle according to an embodiment of the present disclosure.

The flow of the method in the present disclosure will be described in detail below. FIG. 2A is an overall flow diagram of a method for generating a panoramic surround view image of a vehicle according to an embodiment of the present disclosure, and FIG. 2B is a specific flow diagram of a method for generating a panoramic surround view image of a vehicle according to an embodiment of the present disclosure. In some embodiments, as shown in FIGS. 2A and 2B, the method for generating a panoramic surround view image of a vehicle described in the present disclosure can be summarized into four sections: acquiring actual original images 21, acquiring actual independent surround view images 22, acquiring coordinates of hinge points 23 and acquiring a panoramic surround view image 24.

The so-called actual original images and actual independent surround view images here are to be distinguished from the training original images and the training actual independent surround view images in the process of calculating the coordinates of the hinge points. The "actual" emphasizes the images obtained during the actual driving process of the vehicle. The "training" emphasizes the images obtained by artificially setting a specific angle between the first part and the second part of the vehicle in order to obtain the coordinates of the hinge points.

At Step 21, the operation of acquiring actual original images include:

Step 201, acquiring actual original images of external environment of the first part and the second part of the vehicle hinged to each other, wherein the first part and the second part referred to herein may be, for example, a front and a carriage, which of course could be two carriages in other cases.

The actual original images are the images directly obtained by the cameras, and they may include the actual original images of the external environment of the first part and second part. Of course, these actual original images may also include partial images of the vehicle itself. In some embodiments, wide-angle cameras can be provided outside the vehicle to obtain the actual original images. In some embodiments, the wide-angle cameras may be cameras of 180° or other angles. In some embodiments, shooting angle of each actual original image may be enlarged as much as possible in order to obtain better imaging performances.

In Step 22, the operation of acquiring actual independent surround view images include:

Step 202, processing the actual original images to obtain respective actual independent surround view images of the first part and the second part.

Data of the actual original images of the first part and the second part obtained in the Step 201 are unprocessed, and the images captured by adjacent cameras have overlapping areas. Therefore, it is necessary to convert the actual original images (the specific conversion process will be described in details later), and then fix and stitch the multiple images belonging to the same part (the first part or the second part) to obtain a complete actual independent surround view image of each part. The actual independent surround view image of the first or second part is a complete top view of the actual external environment of the part except the hinged side.

Figure 3:
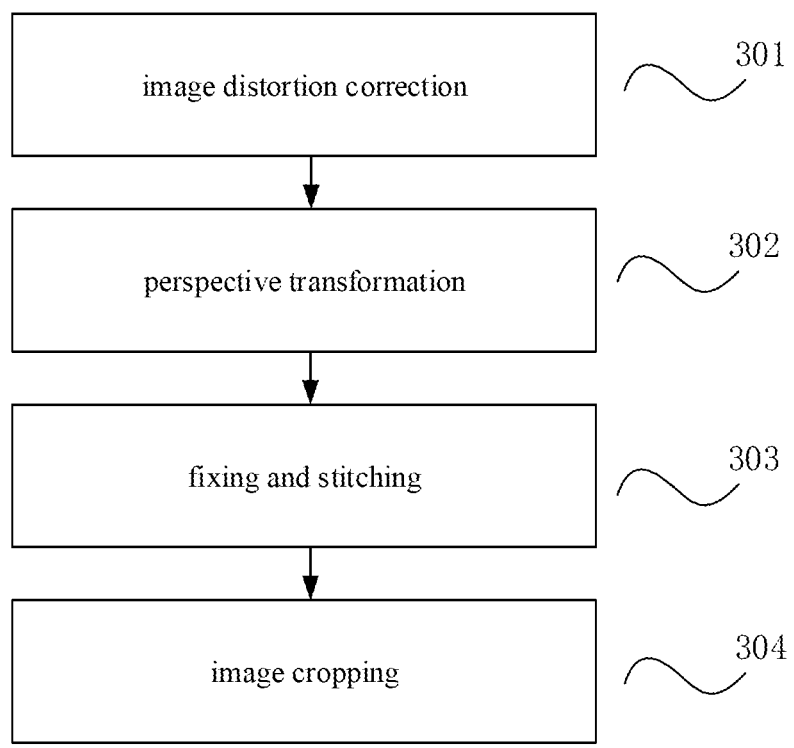
FIG. 3 is a flow diagram of a method for fixing and stitching actual original images of various hinged parts of a vehicle according to an embodiment of the present disclosure.

Before continuing to introduce other operations for obtaining the panoramic surround view image, a specific method for obtaining the independent surround view image of each part will be introduced in details first. FIG. 3 is a flow diagram of a method for fixing and stitching actual original images of various hinged parts of a vehicle according to an embodiment of the present disclosure, which actually is further description of the Step 202 in the foregoing method. The method includes:

Step 301, correcting distortion on the actual original images.

In some embodiments, the original images captured by the wide-angle cameras have a feature of perspective distortion, the effect of which will cause the images to be distorted and thus cannot correctly reflect the distance relationship of objects in the images. In order to eliminate this distortion, it is necessary to perform distortion correction processing on the original images collected by the wide-angle cameras. In some embodiments, the camera parameters calibrated by the wide-angle cameras and distortion correction parameters may be used to perform correction processing on the actual original images to obtain corrected images corresponding to the actual original images. The camera parameters and distortion correction parameters could be determined according to the internal structure of the wide-angle cameras and an established distortion model.

Step 302, performing perspective transformation on the distortion corrected images.

In practical applications, what a user needs to see is the operating state diagram of the vehicle from a top perspective, so it is also necessary to perform perspective transformation on the distortion corrected images. In some embodiments, the images obtained by different cameras are projected into the geodetic coordinates system to obtain an actual bird's-eye view (which can be obtained by selecting the specified feature points of the calibration object and performing perspective transformation), and generate a mapping relationship between the corrected images to the actual bird's-eye view, to obtain an actual bird's-eye view corresponding to each corrected image.

Step 303, fixing and stitching the actual bird's-eye views.

For all the parts of the vehicle hinged to each other, the actual bird's-eye views of each part in all directions can be stitched together. Due to the characteristics of wide-angle cameras, there is a partial overlapping area between the actual bird's-eye views captured by adjacent cameras on each part, and thus the overlapping area needs to be fixed to stitch an actual fixed mosaic.

In some embodiments, fixing and stitching can be achieved by manually selecting several marker points for matching. Of course, other known methods can also be used for the matching.

Step 304, cropping the actual fixed mosaic.

The actual fixed mosaic of each part of the vehicle is obtained in the foregoing steps, but such an actual fixed mosaic may also include unnecessary portions. In some embodiments, for the actual fixed mosaic of each part, the region of interest can be cropped as required, so that the image size conforms to the display range of the screen, thereby being displayed on the screen, and finally the respective actual independent surround view images of the first part and the second part can be obtained.

What follows is introduction of the method for generating a panoramic surround view image of a vehicle described in the present disclosure as shown in FIGS. 2A and 2B. In Step 23, the step of acquiring the coordinates of the hinge points specifically includes:

Step 203, obtaining coordinates of hinge points.

For the vehicle, the coordinates of the hinge points can be calculated each time when it is started and initialized, or the hinge points can be calibrated at the same time when the cameras coordinates are calibrated. During the driving, the calculation can be performed according to the coordinates of the known hinge points, and it is not necessary to make repeated calculation. The method for calculating the coordinates of the hinge points will be introduced separately later.

The so-called training independent surround view image here refers to that, in order to calculate the hinge point coordinates of the first part and the second part, n kinds of relative positions are artificially formed between the first part and the second part, and n pairs of training independent surround view images of the first part and the second part are obtained accordingly. Based on the matched feature points in the n pairs of training independent surround view images, n training rotation angles can be obtained accordingly by calculation. Combined with the corresponding n training translation vectors, the respective coordinates of hinge points of the first part and second part of the vehicle can be determined.

Figure 4:
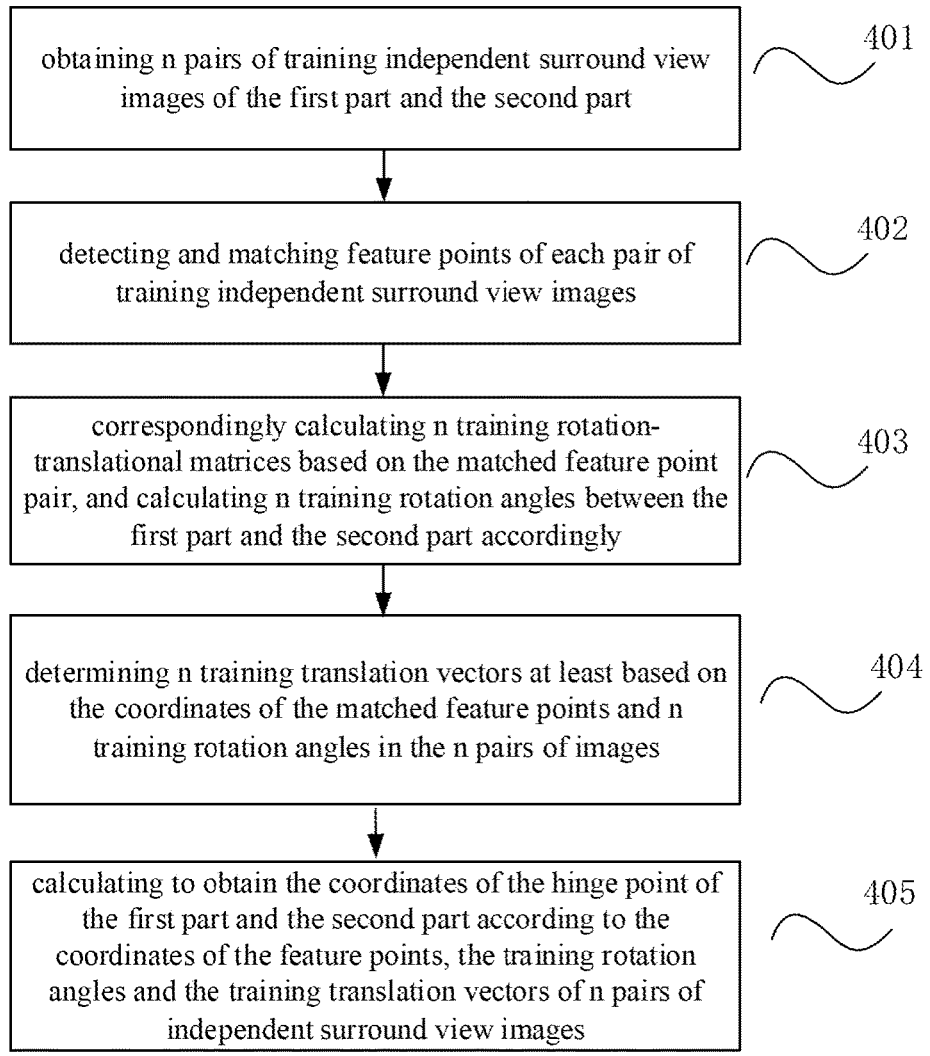
FIG. 4 is a flow diagram of a method for calculating the coordinates of hinge points of various parts of a vehicle according to an embodiment of the present disclosure.

FIG. 4 is a flow diagram of a method for calculating the coordinates of hinge points of various parts of a vehicle according to an embodiment of the present disclosure. As described above, the calculation of the coordinates of hinge points is not part of the method shown in FIG. 2A, but a method of calculating the coordinates of hinge points that has been performed before the method.

As shown in FIG. 4, the method for calculating the coordinates of the hinge points of each part of the vehicle may include:

In step 401, obtaining respectively n pairs of training original images of the first part and the second part, and fixing and stitching to obtain n pairs of training independent surround view images. Each pair of images corresponds to a relative position of the first part and the second part, and there are n kinds of positions in total, wherein n can be a positive integer greater than or equal to 2. The operation of obtaining training independent surround view images by fixed stitching is similar to the operation of obtaining actual independent surround view images described above, which will not be described again.

Step 402, detecting and matching feature points of each of the n pairs of training independent surround view images of the first part and the second part.

In some embodiments, a feature point refers to a point in the image that has distinct characteristics and can effectively reflect the essential characteristics of the image and can identify the target object in the image. The feature points of an image comprise two sections: keypoint and descriptor. The keypoint refers to the position, orientation and scale information of the feature point in the image. The descriptor is usually a vector, which describes information of the pixels around the keypoint as artificial design approach. Generally, similar-looking keypoints have corresponding similar descriptors. Therefore, during the matching, two feature points could be deemed as the same feature point as long as their descriptors are similar in distance in a vector space.

Specifically, for each pair of training independent surround view images, keypoints of the training independent surround view images of the two hinged parts can be obtained, and the descriptors of the feature points can be calculated according to the positions of the keypoints. The feature points of the surround view images of the two hinged parts of the vehicle are matched according to the descriptors of the feature points to obtain a matched feature point pair of the surround view images of the two hinged parts of the vehicle. In one embodiment, the Brute Force matching algorithm can be used, which compares the descriptors of the feature points of the training independent surround view images of the two hinged parts one by one in a vector space, and selects the pair with a smaller distance as a matched point pair.

Step 403, calculating n training rotation-translation matrices between the feature points of the first part and the second part based on the matched feature point pair, and calculating n training rotation angles between the first part and the second part accordingly. Here are some examples of calculating training rotation angles based on the matched feature point pair.

In some embodiments, the random sampling consensus algorithm (RANSAC) or the least median method (LMedS) can be used to select matched feature point pairs of the training independent surround view images of the two hinged parts. Taking the random sampling consensus algorithm as an example, specifically, several pairs of matched points are extracted from the obtained matched point pairs, a rotation-translation matrix is calculated, and the pairs of matched points are recorded as "interior points". Searching for non-interior points in the matched point pairs is then continued, and the matched point pairs, if fitting the matrix, will be added as the interior points. When the number of the point pairs in the interior points is greater than a preset threshold, the rotation-translation matrix can be determined from these data. According to the above method, randomly sampling is conducted k times (k is a positive integer greater than 0) to select the largest set of interior points, and eliminate mismatched point pairs such as the non-interior points. Only after the mismatched points are eliminated, the correct matched point pairs in the interior points can be used to obtain the training rotation-translation matrix corresponding to a specific position. According to n training rotation-translation matrices, n training rotation angles $\theta_1 \ldots \theta_n$ between the first part and the second part are obtained.

In the method involved in the present disclosure, the acquisition of the training rotation angles is obtained by calculation. Different from the method through physical measurement in the prior art, the method involved in the present disclosure could obtain a more accurate result, and the operation difficulty of obtaining the training rotation angles is lower. Meanwhile, the method in the present disclosure reduces provision of sensors, causing a lower cost and wider applicability, and it can avoid interference factors in the environment.

Step 404, determining n training translation vectors at least based on the coordinates of the matched feature points between the n pairs of training independent surround view images of the first part and the second part and the corresponding n training rotation angles between the first part and the second part.

According to one embodiment, suppose $(a_x, a_y)$ can be set as the coordinates of the hinge point of the first part 101 of the vehicle, $(b_x, b_y)$ as the coordinates of the hinge point of the second part 102 of the vehicle, $(x_0, y_0)$ and $(x_1, y_1)$ are the coordinates of the feature points matching each other in the training independent surround view images of the first part 101 and the second part 102 respectively, and $\theta$ is the training rotation angle of the first part and the second part, then $$\begin{bmatrix} \cos\theta & -\sin\theta & 0 \\ \sin\theta & \cos\theta & 0 \\ 0 & 0 & 0 \end{bmatrix} \begin{bmatrix} x_0 - a_x \\ y_0 - a_y \\ 1 \end{bmatrix} + \begin{bmatrix} b_x \\ b_y \\ 1 \end{bmatrix} = \begin{bmatrix} x_1 \\ y_1 \\ 1 \end{bmatrix} \quad (1)$$

The formula (1) can be disassembled to obtain the formula (2)

$$\begin{cases} \cos\theta * x_0 - \sin\theta * y_0 - a_x * \cos\theta + a_y * \sin\theta + b_x = x_1 \\ \sin\theta * x_0 + \cos\theta * y_0 - a_x * \sin\theta - a_y * \cos\theta + b_y = y_1 \end{cases} \quad (2)$$

The training translation vector is the training translation parameter of the feature points of the training independent surround view images of the two hinged parts translating from one image to the other image, for example, the training translation parameter of the feature points in the matched point pairs translating from the independent surround view image of the first part 101 to the independent surround view image of the second part 102. Therefore, for a pair of matched points, assuming that the coordinates of the feature point of the training independent surround view image of the first part 101 of the vehicle is the origin, the coordinates of the matched point corresponding to the training independent surround view image of the second part 102 of the vehicle is numerically equal to the training translation vector for the two images. That is, if the feature point of the training surround view image of the first part $(x_0, y_0)$ is set as $(0, 0)$, the coordinates of the feature point matched by the training surround view image of the second part $(x_1, y_1)$ is the training translation vector from the training surround view image of the first part to the training surround view image of the second part $(dx, dy)$, which can be expressed by formula (3):

$$\begin{cases} -a_x * \cos\theta + a_y * \sin\theta + b_x = dx \\ -a_x * \sin\theta - a_y * \cos\theta + b_y = dy \end{cases} \quad (3)$$

Step 405, calculating to obtain the coordinates of the hinge point of the first part and the second part of the vehicle according to the coordinates of the feature points, the training rotation angles and the training translation vectors of the n pairs of training independent surround view images. The calculation here is based on such a premise that the points in the training independent surround view images of the first part and the second part of the vehicle are all rotated around their respective hinge points when moving direction of the vehicle changes.

For each training rotation angle θ, there is a corresponding training translation vector. ($a_x$, $a_y$, $b_x$, $b_y$) can be obtained by bringing then training rotation angles and n training translation vectors into formula (4):

$$\arg\min_{(a_x,a_y,b_x,b_y)} \left\| \begin{bmatrix} -\cos\theta_1 & \sin\theta_1 & 1 & 0 \\ \sin\theta_1 & -\cos\theta_1 & 0 & 1 \\ \vdots & \vdots & \vdots & \vdots \\ -\cos\theta_n & \sin\theta_n & 1 & 0 \\ \sin\theta_n & -\cos\theta_n & 0 & 1 \end{bmatrix} * \begin{bmatrix} a_x \\ a_y \\ b_x \\ b_y \end{bmatrix} - \begin{bmatrix} dx_1 \\ dy_1 \\ \vdots \\ dx_n \\ dy_n \end{bmatrix} \right\| \quad (4)$$

In general, multiple pairs of training independent surround view images of the first part and second part should be taken for test calculation, and thus the value of n will be much larger than 2, thereby forming an overdetermined system such as the formula (4). The least squares method can be used to solve the overdetermined system, and the coordinates of hinge point of the first part and the second part that are closest to the actual value can be obtained by the calculation, that is, ($a_x$, $a_y$, $b_x$, $b_y$) with the smallest value of the expression.

Considering that if there are several outliers in the above n angles, they will greatly affect calculation results of the coordinates of the hinge point. Accordingly, a further method can be used to eliminate the interference caused by outliers.

According to one embodiment, it is assumed that two sets of training rotation angles ($\theta_i$, $\theta_j$) and corresponding training translation vectors are selected from the n training rotation angles. The selected training rotation angles should satisfy $|\theta_i - \theta_j| > \xi$ (where ξ is a preset angle, which can be set upon actual requirements; for example, it as large as possible can be selected to satisfy the accuracy of the calculation, i and j are integers greater than 0 and less than or equal to n, and i is not equal to j), in order to make the obtained result more robust. That is, the angle difference between any two training rotation angles is greater than the preset value. Therefore, for any set of training rotation angles ($\theta_i$, $\theta_j$) and training translation parameters ($dx_i$, $dy_i$, $dx_j$, $dy_j$), a set of coordinates of the candidate hinge point coordinates ($a_x$, $a_y$, $b_x$, $b_y$) is obtained by solving the formula (5):

$$\arg\min_{(a_x,a_y,b_x,b_y)} \left\| \begin{bmatrix} -\cos\theta_i & \sin\theta_i & 1 & 0 \\ \sin\theta_i & -\cos\theta_i & 0 & 1 \\ -\cos\theta_j & \sin\theta_j & 1 & 0 \\ \sin\theta_j & -\cos\theta_j & 0 & 1 \end{bmatrix} * \begin{bmatrix} a_x \\ a_y \\ b_x \\ b_y \end{bmatrix} - \begin{bmatrix} dx_i \\ dy_i \\ dx_j \\ dy_j \end{bmatrix} \right\| \quad (5)$$

Then with m sets of training rotation angles ($\theta_i$, $\theta_j$) and m sets of training translation parameters ($dx_i$, $dy_i$, $dx_j$, $dy_j$) the coordinates of m sets of candidate hinge points can be obtained:

$$\begin{bmatrix} (a_x, a_y, b_x, b_y)_1 \\ (a_x, a_y, b_x, b_y)_2 \\ \vdots \\ (a_x, a_y, b_x, b_y)_m \end{bmatrix} \quad (6)$$

Then the coordinates of the m sets of candidate hinge points are sorted, the sorting result showing a Gaussian distribution, and a median of the sorting results is taken as the coordinates of the hinge point.

In this embodiment, n could be an integer greater than or equal to 2, m could be an integer greater than or equal to 1, and m is less than n. With the above method, the influence of the outliers of the training rotation angles on the calculation result can be effectively reduced.

In the above method, the final coordinates of the hinge point are obtained by matching and calculating the feature points of the training independent surround view images of the two hinged parts. Compared with the traditional physical measurement technology, the coordinates of the hinge point obtained by this method are more accurate. For vehicles with hinged structures, it is more adaptable because there is no need to install physical measurement instruments. The method is simple and reliable in operation, and can achieve calibration of the hinge point without the aid of other tools, saving labor cost and material resources.

As shown in FIGS. 2A and 2B, what follows is the introduction of the method for generating a panoramic surround view image of a vehicle described in the present disclosure. At Step 24, the operation of acquiring a panoramic surround view image includes:

Step 204, determining matched feature point pairs in the overlapping area of the actual independent surround view images of the first part and the second part. The matching here means that there is a corresponding relationship between the two points, or the same point is represented in the independent surround view images of the first part and the second part. However, in practical situations, the matched points are not necessarily the points that are successfully matched as mentioned later.

In some embodiments, the method for matching the feature point pairs includes feature point detection, feature point matching, and feature point screening. In some embodiments, the foregoing method process is similar to Step 402 and Step 403, which would not be repeated here, and the difference is that the image data of the operation are images obtained during actual driving instead of training images.

In some embodiments, the feature point detection method may include ORB, SURF, or SIFT algorithm, or the like.

In some embodiments, the feature point matching algorithm may include the Brute Force matching algorithm or the Nearest Neighbor matching algorithm, or the like.

In some embodiments, the feature point screening method is further included, which may include RANSAC or GMS algorithm or the like.

Step 205, overlapping the hinge points of the actual independent surround view images of the first part and the second part, and assuming that the independent surround view image of the second part remains stationary, rotating the independent surround view image of the first part around the overlapped hinge points, or assuming the matched feature points of the first part are rotated relative to the matched feature points of the second part, determining the number of successfully matched point pairs in the matched feature point pairs.

Of course, according to other embodiments, it can also be assumed that the independent surround view image of the first part remains stationary, the independent surround view image of the second part is rotated around the hinge points, or that the matched feature points of the second part rotate relative to the matched feature points of the first part.

According to an embodiment, the coordinates of the feature points in the actual independent surround view image of the first part of the vehicle are set as $x_i$, and the coordinates of the feature points corresponding to $x_i$ in the actual independent surround view image of the second part are $x'_i$, and ε is the distance between the matched feature point pairs in the actual independent surround view images of the first part and the second part, as expressed in formula (7):

$$\varepsilon = \|x'_i - H^* x_i\| \tag{7}$$

where H(β, t) is the rotation-translation matrix (two-dimensional) between the feature point sets matched by the actual independent surround view images of the first part and the second part, as expressed by formula (8). β is the hypothetical rotation angle between the first part and second part of the vehicle. $t(t_1, t_2)$ is the translation vector of the hinge point of the independent surround view image of the first part relative to the hinge point of the independent surround view image of the second part.

$$H(\beta, t) = \begin{bmatrix} \cos\beta & -\sin\beta & t_1 \\ \sin\beta & \cos\beta & t_2 \end{bmatrix} \tag{8}$$

According to one embodiment, when the distance ε of the matched feature point pairs detected in the actual independent surround view images of the first part and the second part is smaller than a first threshold σ, it is considered that the feature point matching is successful. According to one embodiment, the first threshold may be set upon user's needs.

In some embodiments, this result can be expressed using the Iverson bracket, as shown in formula (9):

$$[P] = \begin{cases} 1 & \text{if } P \text{ is true} \\ 0 & \text{otherwise} \end{cases} \tag{9}$$

where P can be expressed as formula (10):

$$\|x'_i - H^* x_i\| < \sigma \tag{10}$$

That is to say, when the value on the left side of the formula (10) is less than the first threshold σ, P is 1, otherwise P is 0.

Formula (11) can be used to calculate the number k of successfully matched feature point pairs $$k = \Sigma_{i=0}^{L} [\|x'_i - H^* x_i\| < \sigma] \tag{11}$$

The value of i ranges from 0 to L, where L is the number of matched feature point pairs in the actual independent surround view images of the first part and the second part, and L is an integer greater than or equal to 1.

Step 206, taking the rotation angle corresponding to the maximum number of successfully matched feature point pairs as the candidate rotation angle of the first part relative to the second part.

According to an embodiment, formula (12) can be used to determine the candidate rotation angle $\beta_1$ corresponding to the maximum number of successfully matched feature point pairs:

$$\beta_1 = \arg\max \Sigma_{i=0}^{L} [\|x'_i - H^* x_i\| < \sigma] \tag{12}$$

In this embodiment, the candidate rotation angle is unique; if it is not unique, the calculation can be continued according to the following embodiment to determine the actual rotation angle.

Optionally, according to an embodiment, Step 206 may directly jump to Step 208, where is taking the candidate rotation angle as the actual rotation angle, fusing the respective actual independent surround view images of the first part and the second part according to the coordinates of the hinge points and the actual rotation angle, to obtain a panoramic surround view image of the vehicle.

In the method introduced in this embodiment, the actual rotation angle between the first part and the second part of the vehicle can be quickly determined, which saves computing resources and facilitates rapid synthesis of a panoramic surround view image of the vehicle during actual driving.

Optionally, in another embodiment, Step 206 could jump to Step 207.

Step 207, where is determining coordinates of the successfully matched feature point pair based on the candidate rotation angle, calculating distances between two points in each successfully matched feature point pair and summing the distances, and taking the rotation angle corresponding to the minimum summation result as the actual rotation angle of the first part relative to the second part.

If there is only one candidate rotation angle obtained in Step 206, Step 207 can still be used to fine-tune the candidate rotation angle. If the operation of Step 207 is directly performed without going through Step 206, a wrong rotation angle may be obtained because the sum of the distances between the mismatched feature point pairs is the smallest. Therefore, it is important to perform the operation in Step 206 first.

Formula (13) can be used to determine the candidate rotation angle $\beta_2$ corresponding to the minimum sum of the distances between feature point pairs:

$$\beta_2 = \arg\min \Sigma_{j=0}^{G} \|x'_j - H^* x_j\|, x_j, x'_j \in X_G \tag{13}$$

where G is the number of successfully matched feature point pairs, $X_G$ is the set of the successfully matched feature points, G is an integer greater than or equal to 1, and G is less than or equal to L.

If the number of the candidate rotation angles obtained in Step 206 is not unique, it is necessary to select one therefrom as the final actual rotation angle. Suppose there are F candidate rotation angles, where F is an integer greater than 1. The F rotation angles could be brought into the formula (8) to obtain F candidate rotation-translation matrices H, and the F rotation-translation matrices are brought into the formula (10) to calculate the coordinates of all the successfully points Xj and Xj', obtaining a point set $X_G$.

Then, formula (14) is used to calculate the angle $\beta_2$ corresponding to the minimum sum of distances between successfully matched feature point pairs based on multiple candidate rotation-translation matrices $H_m$.

$$\beta_2 = \arg\min \Sigma_{m=0}^{F} \Sigma_{j=0}^{G} \|x'_j - H_m^* x_j\|, x_j, x'_j \in X_G \tag{14}$$

After the candidate rotation angle $\beta_2$ corresponding to the minimum sum of the distances between the successfully matched feature point pairs is determined, it can be used as the actual rotation angle of the first part relative to the second part.

Step 207 can directly jump to Step 209, where according to the coordinates of the hinge point and the actual rotation angle $\beta_2$, the actual independent surround view images of the first part and the second part are fused to obtain a panoramic surround view image of the vehicle.

The method introduced in this embodiment further sets constraints for fine calculation, and further fine-tunes the calculation results in Step 206, so that the successfully matched feature point pairs are closer to each other, bringing about higher degree of coincidence, and the obtained actual rotation angle is closer to reality, which improves certainty of the actual rotation angle obtained by the calculation and makes the final result more robust and more accurate.

In addition, the method in this embodiment also solves the problem that the multiple candidate rotation angle cannot be determined since there are multiple candidate rotation angles obtained in Step 206, thereby improving certainty of the final result.

The method of the present disclosure is based on the hinge relationship of the first part and the second part, thus the precondition of the coincidence of the coordinates of the hinge points of the two parts is set so that the angle with the largest number of successfully matched feature point pairs is selected as the actual rotation angle under this precondition. However, in the existing methods, calculating the rotation-translation relationship between the first part and the second part only based on the matched feature points in the surround view image would cause a peristaltic visual effect that the distance between the first part and the second part seems sometimes long and sometimes short in different situations. The present disclosure avoids this problem very well because the coordinates of the hinge point of the first part and the second part are fixed.

In the method of the present disclosure, there is no need to install other sensors (such as angle sensors) to obtain vehicle steering data, and the panoramic surround view function in the case of the angle of the vehicle is changing can be achieved only through the images collected by the cameras and the feature matching of images, which solves the problem of the traditional surround view solutions that seamless surround view stitching cannot be achieved in the case of real time change of the rotation angles of the first part and the second part, thereby bringing about the advantages of simple operation and low cost.

Figure 5:
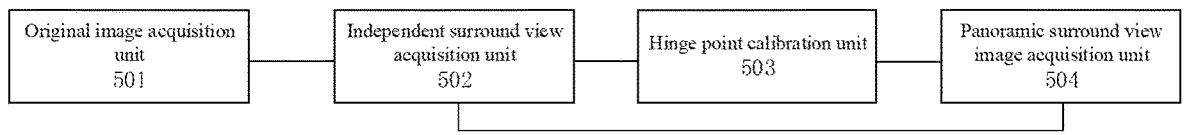
FIG. 5 is a schematic diagram of a device for generating a panoramic surround view image of a vehicle according to an embodiment of the present disclosure.

FIG. 5 is a schematic diagram of a device for generating a panoramic surround view image of a vehicle according to an embodiment of the present disclosure. This device may be located on the vehicle or in a remote server of the vehicle.

As shown in the figure, the structure of the device for generating a panoramic surround view image of a vehicle may include:

An original image acquisition unit 501 configured to acquire an original image of external environment of two hinged parts of the vehicle. In some embodiments, the original image acquisition unit 501 may include one or more wide-angle cameras disposed on the non-hinged side of the two hinged parts of the vehicle. The original image acquisition unit 501 can be used to acquire actual original images and can also be used to acquire training original images.

An independent surround view image acquisition unit 502, which is coupled to the original image acquisition unit 501, configured to stitch the respective original image data of the two parts into an independent surround view image of the part. The independent surround view image acquisition unit 502 can be used to obtain actual independent surround view images of the first part and the second part of the vehicle and can also be used to obtain training independent surround view images of the two parts.

A hinge point calibration unit 503, which is coupled to the independent surround view image acquisition unit 502, configured to calculate the coordinates of hinge points according to the training independent surround view image data. According to one embodiment, the hinge point calibration unit 503 could be configured to perform the operation in the Steps 402-405 of the method in the embodiment shown in FIG. 4. The operation of this unit is to obtain the coordinates of hinge points. The coordinates of hinge points are obtained by calculation before actual driving of the vehicle or at each time when it is started. Once obtained, the coordinates value is recorded for subsequent use.

Of course, according to other embodiments, the device may also not include a hinge point calibration unit, and the coordinates of hinge points may be calculated by a remote server, in which the calculated coordinates of hinge points may be sent to the device.

A panoramic surround view image acquisition unit 504, which is coupled to the hinge point calibration unit 503 and the independent surround view image acquisition unit 502, configured to determine the actual rotation angle of the first part relative to the second part, and combine the actual independent surround view images of the two parts into a panoramic surround view image of the vehicle according to the coordinates of the hinge points and the actual rotation angle.

According to another embodiment, the device for generating a panoramic surround view image of a vehicle may also not include the hinge point calibration unit, but receive the coordinates of hinge points from outside.

Figure 6:
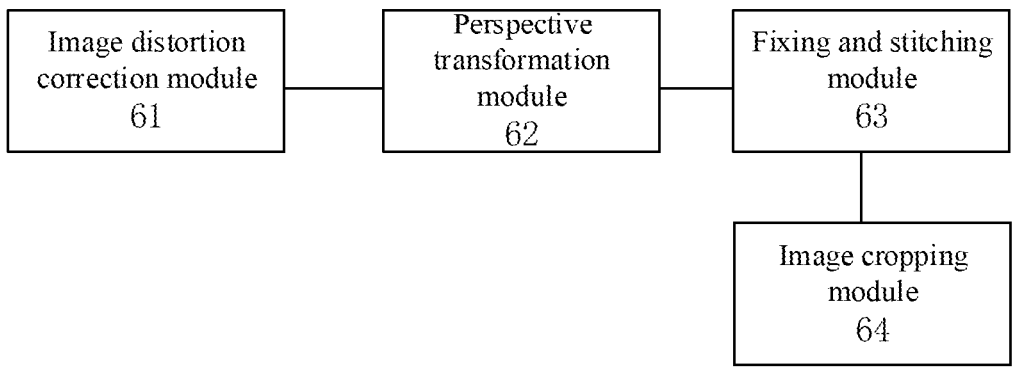
FIG. 6 is a schematic diagram of an independent surround view image acquisition unit of the device for generating a panoramic surround view image of a vehicle according to an embodiment of the present disclosure.

FIG. 6 is a schematic diagram of an independent surround view image acquisition unit of the device for generating a panoramic surround view image of a vehicle according to an embodiment of the present disclosure. As shown in FIG. 6, the independent surround view image acquisition unit 502 may include:

An image distortion correction module 61, which is coupled to the original image acquisition module 501, configured to correct distortion on the original images to obtain corrected images corresponding thereto.

A perspective transformation module 62, which is coupled to the image distortion correction module 61, configured to project the corrected images into the geodetic coordinates system to become a corresponding bird's-eye view.

A fixing and stitching module 63, which is coupled to the perspective transformation module 62, configured to fix and stitch the bird's-eye views of the first part and the second part respectively, to obtain a fixed mosaic of the first part and a fixed mosaic of the second part respectively.

An image cropping module 64, which is coupled to the fixing and stitching module 63, configured to crop the fixed mosaic of the first part and the fixed mosaic of the second part to obtain independent surround view images of the first part and the second part.

The specific method for obtaining the independent surround view images has been disclosed in the foregoing embodiment shown in FIG. 3, which will not be repeated here.

Figure 7:
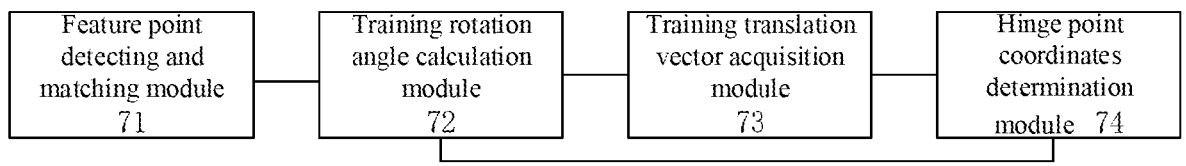
FIG. 7 is a schematic diagram of a hinge point calibration unit of the device for generating a panoramic surround view image of a vehicle according to an embodiment of the present disclosure.

FIG. 7 is a schematic diagram of a hinge point calibration unit of the device for generating a panoramic surround view image of a vehicle according to an embodiment of the present disclosure. As shown in FIG. 7, the hinge point calibration unit 503 may include:

A feature point detecting and matching module 71, which is coupled to the independent surround view image acquisition unit 502, configured to receive n pairs of training independent surround view images of the first part and the second part, and to detect and match each pair of feature points of training independent surround view images of the first part and the second part.

A training rotation angle calculation module 72, which is coupled to the feature point detecting and matching module 71, configured to obtain n training rotation-translation matrices between the feature points in each pair of training independent surround view images of the first part and the second part based on the coordinates of matched feature points, and accordingly obtain n training rotation angles between the first part and the second part in each pair of independent surround view images.

A training translation vector acquisition module 73, which is coupled to the training rotation angle calculation module 72, configured to determine n training translation vectors corresponding to each pair of independent surround view images according to the coordinates of the feature points of each pair of training independent surround view images of the first part and the second part and the n training rotation angles.

A hinge point coordinates determination module 74, which is coupled to the training translation vector acquisition module 73 and the training rotation angle calculation module 72, configured to determine the coordinates of the hinge point of the first part and the second part of the vehicle according to the coordinates of the matched feature points of the n pairs of training independent surround view images, the n training rotation angles and the corresponding n training translation vectors.

The specific method for obtaining the coordinates of hinge points has been disclosed in the embodiment shown in FIG. 4, which will not be repeated here.

In some embodiments, the hinge point coordinates determination module 74 may be further configured to: firstly divide the n pairs of training independent surround view images into in sets where each set has two pairs, and then obtain a calculation result of the corresponding hinge point coordinates according to the coordinates of the feature points of each set of training independent surround view images, the training rotation angle and the training translation vector, and then sort the calculation results of all the sets of coordinates of hinge points after obtaining the calculation results of the m sets of training independent surround view images, and take a median of the sorting results as the coordinates of hinge point, wherein the specific method has been disclosed in the contents related to the aforementioned formula (5) and formula (6), which will not be repeated here.

In some embodiments, the angle difference of the training rotation angles between the first part and the second part in the set of training independent surround view images may be larger than a preset angle so as to satisfy accuracy of the calculation.

The above-mentioned device for generating a panoramic surround view image of a vehicle obtains final coordinates of hinge points by matching and calculating the feature points of the training independent surround view images of the two hinged parts. Compared with the traditional physical measurement technology, the coordinates of hinge points obtained by this method are more accurate. For the vehicles with hinged structures, this method is of wider adaptability. The method is simple and reliable in operation, and it can realize the calibration of the hinge points without using other tools such as an angle sensor, thereby saving labor cost and material resources.

Figure 8:
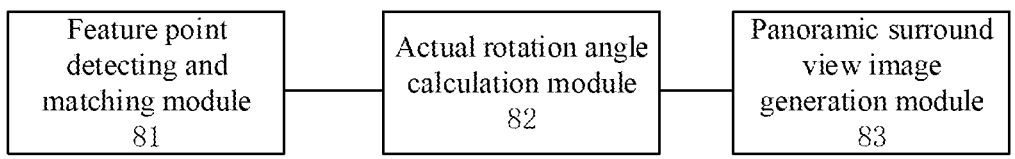
FIG. 8 is a schematic diagram of a panoramic surround view image acquisition unit of a device for generating a panoramic surround view image of a vehicle according to an embodiment of the present disclosure.

FIG. 8 is a schematic diagram of a panoramic surround view image acquisition unit of a device for generating a panoramic surround view image of a vehicle according to an embodiment of the present disclosure. As shown in FIG. 8, the panoramic surround view image acquisition unit 504 includes:

A feature point detecting and matching module 81, which is coupled to the independent surround view image acquisition unit 502, configured to receive the actual independent surround view images of the first part and the second part, and to detect and match the feature points therein. 81 and 71 may be the same or different modules according to different embodiments.

An actual rotation angle calculation module 82, which is coupled to the feature point detecting and matching module 81 and the hinge point calibration unit 503, configured to receive the coordinates of hinge points, and overlap the hinge points of the independent surround view images of the first part and the second pan, calculate a distance between two points in each matched feature point pair, and take the matched feature point pair with the distance less than the preset first threshold as a successfully matched feature point pair, and take the rotation angle corresponding to the maximum number of the successfully matched feature point pairs as a candidate rotation angle of the first part relative to the second part.

A panoramic surround view image generation module 83, which is coupled to the actual rotation angle calculation module 82 and the hinge point calibration unit 503, configured to use the candidate rotation angle as the actual rotation angle, and obtain a panoramic surround view image of the vehicle after fusing the respective actual independent surround view images of the first part and the second part according to the coordinates of the hinge points and the actual rotation angle.

According to another embodiment, the actual rotation angle calculation module 82 may be further configured to determine the coordinates of the successfully matched feature point pair based on the candidate rotation angle, calculate a distance between two points in each successfully matched feature point pair and sum the distances, and take the rotation angle corresponding to the minimum summation result as the actual rotation angle of the first part relative to the second part.

A panoramic surround view image generation module 83, which is coupled to the actual rotation angle calculation module 82 and the hinge point calibration unit 503, configured to obtain a panoramic surround view image of the vehicle by rotating, translating and stitching the respective actual independent surround view images of the first part and the second part according to the coordinates of the hinge points and the determined actual rotation angle.

Figure 9:
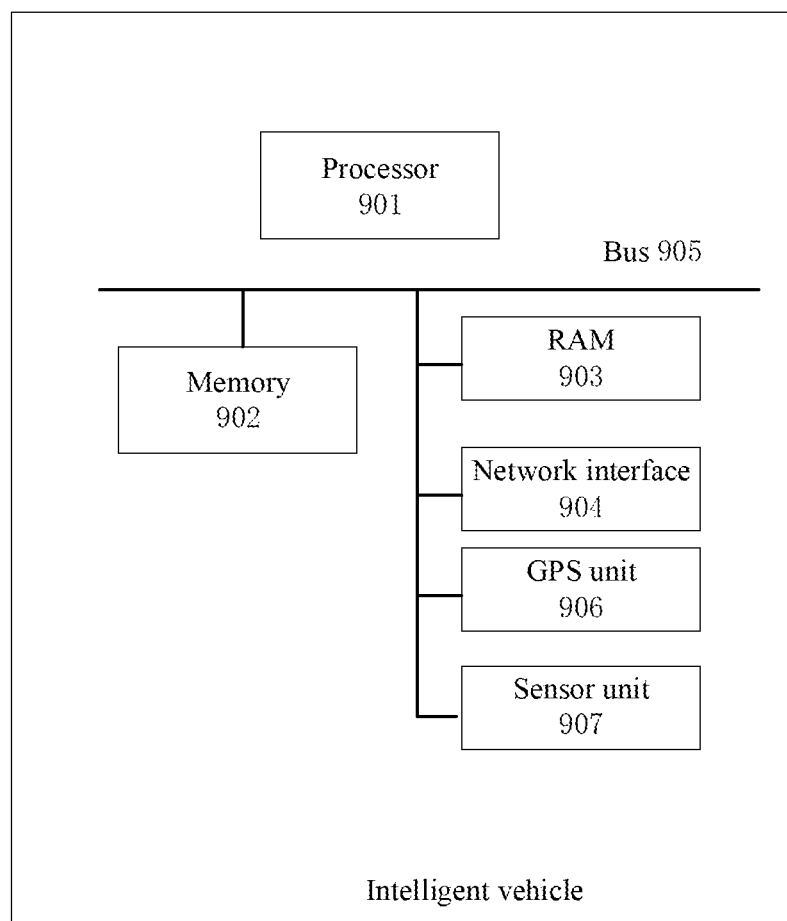
FIG. 9 is a schematic diagram of an intelligent vehicle according to an embodiment of the present disclosure.

FIG. 9 is a schematic diagram of an intelligent vehicle according to an embodiment of the present disclosure. The intelligent vehicle includes a processor 901 and a memory 902 for storing a computer program that can be executed on the processor 901, wherein the processor 901 is configured to execute all or part of the methods provided in any of the embodiments of the present disclosure when running the computer program. The respective amount of the processor 901 and the memory 902 herein is not limited to one, which could be one or more. The intelligent vehicle may also include an RAM 903, a network interface 904, and a system bus 905 connecting the RAM 903, the network interface 904, the processor 901 and the memory 902. The operating system and the data processing device provided in the embodiments of the present disclosure are stored in the memory. The processor 901 is used to support the operation of the entire intelligent vehicle. The RAM 903 may be used to provide an environment for the execution of computer programs in the memory 902. The network interface 904 can be used for external server devices, terminal devices and the like to perform network communication, receiving or sending data, such as obtaining driving control instructions input by users. The intelligent vehicle may further include a GPS unit 906 configured to obtain location information of the vehicle. The sensor unit 907 may include a wide-angle camera configured to acquire actual or training original images.

Embodiments of the present disclosure further provide a computer storage medium, for example, including a memory storing a computer program, which can be executed by the processor to complete the steps of the camera attitude information detection provided by any embodiment of the present disclosure. The computer storage medium can be such a memory as FRAM, ROM, PROM, EPROM, EEPROM, Flash Memory, magnetic surface memory, optical disk, or CD-ROM; and it can also be various devices including one or any combination of the above memories.

According to other embodiments, the methods involved in the present disclosure may also be executed in whole or in part by a remote server of an intelligent driving apparatus.

The above-mentioned embodiments only represent several embodiments of the present disclosure, and the descriptions thereof are relatively specific and detailed, which should not be construed as limiting the scope of the patent application. It should be noted that those skilled in the art could make modifications and improvements without departing from the concept of the present disclosure, which all fall into the protection scope of the present disclosure. Therefore, the scope of protection of the present disclosure shall be subject to the appended claims.

What is claimed is:

1. A method for generating a panoramic surround view image of a vehicle, comprising:
    acquiring actual original images of external environment of a first part and a second part of the vehicle hinged to each other;
    processing the actual original images to obtain respective actual independent surround view images of the first part and the second part;
    obtaining coordinates of respective hinge points of the first part and the second part;
    determining matched feature point pairs in the actual independent surround view images of the first part and the second part;
    overlapping the respective hinge points in the actual independent surround view images of the first part and the second part, and assuming that the independent surround view image of the first part is rotated relative to the independent surround view image of the second part or assuming that matched feature points of the first part are rotated relative to matched feature points of the second part, calculating a distance between two points in each matched feature point pair accordingly, and taking a matched feature point pair with the distance less than a preset first threshold as a successfully matched feature point pair;
    determining an actual rotation angle of the first part relative to the second part at least based on number of the successfully matched feature point pairs; and
    obtaining a panoramic surround view image of the vehicle after fusing the respective actual independent surround view images of the first part and the second part according to the coordinates of the hinge points and the actual rotation angle,
    wherein obtaining the coordinates of the respective hinge points of the first part and the second part that comprises:
        obtaining multiple pairs of training independent surround view images of the first part and the second part;
        detecting and matching feature points in terms of each pair of the training independent surround view images;
        calculating a plurality of corresponding training rotation-translation matrices based on the matched feature point pairs in each pair of the training independent surround view images, and then calculating a plurality of corresponding training rotation angles between the first part and the second part;
        determining a plurality of corresponding training translation vectors between the first part and the second part at least based on coordinates of the matched feature points in the multiple pairs of training independent surround view images as well as the plurality of training rotation angles; and
        calculating to obtain the coordinates of the hinge points of the first part and the second part according to the coordinates of feature points of the multiple pairs of independent surround view images, the plurality of training rotation angles and the plurality of training translation vectors.

2. The method according to claim 1, wherein said determining an actual rotation angle of the first part relative to the second part at least based on number of the successfully matched feature point pairs comprises:
    taking an angle corresponding to the maximum number of the successfully matched feature point pairs as the actual rotation angle between the first part and the second part.

3. The method according to claim 1, wherein said determining an actual rotation angle of the first part relative to the second part at least based on number of the successfully matched feature point pairs comprises:
    taking an angle corresponding to the maximum number of the successfully matched feature point pairs as a candidate rotation angle between the first part and the second part;
    determining coordinates of the successfully matched feature point pairs based on the candidate rotation angle;
    calculating a distance between two points in each successfully matched feature point pair and summing the distances; and
    taking a rotation angle corresponding to the minimum summation result as the actual rotation angle of the first part relative to the second part.

4. The method according to claim 3, wherein said determining coordinates of the successfully matched feature point pairs based on the candidate rotation angle comprises obtaining a candidate rotation-translation matrix based on the coordinates of the hinge points of the first part and the second part and the candidate rotation angle; and
    said calculating a distance between two points in each successfully matched feature point pair comprises calculating a distance between two points in the successfully matched feature point pair based on coordinates of the matched feature point pair and the candidate rotation-translation matrix.

5. The method according to claim 1, wherein said processing the actual original images to obtain respective actual independent surround view images of the first part and the second part comprises:

correcting distortion on the actual original images of the external environment of the first part and the second part;

projecting the corrected images into the geodetic coordinates system to generate a bird's-eye view of the first part and the second part;

detecting and matching respectively internal feature points in overlapping areas of the respective bird's-eye views of the first part and the second part, and then fixing and stitching to obtain respective fixed mosaics of the first part and the second part; and cropping the respective fixed mosaics of the first part and the second part to obtain the respective actual independent surround view images of the first part and the second part.

6. The method according to claim 1, wherein said determining matched feature point pairs in the actual independent surround view images of the first part and the second part comprises:

feature point detection, for detecting natural feature points in the overlapping area of the actual independent surround view images of the first part and the second part and generating descriptors;

feature point matching, for generating matched feature point pairs by a matching algorithm at least based on the descriptors, wherein the matching algorithm comprises ORB, SURF or SIFT algorithm; and feature point screening, for screening out mismatched feature point pairs by a screening algorithm, wherein the screening algorithm comprises RANSAC or GMS algorithm.

7. The method according to claim 1, wherein obtaining the coordinates of the respective hinge points of the first part and the second part further comprises:

taking at least two of the plurality of training rotation angles as one set, and calculating to obtain coordinates of candidate hinge points corresponding to the set based on the training translation vectors; and sorting all the coordinates of candidate hinge points, and taking a median of the sorting result as the coordinates of the hinge points of the first part and the second part;

wherein a difference between at least two training rotation angles of each set is greater than a preset angle threshold.

8. An intelligent vehicle, comprising
a first part and a second part hinged to each other;
a processor, and a memory coupled to the processor; and
a sensor unit configured to capture actual or training original images of the first part and the second part;
wherein the processor is configured to implement the method according to claim 1.

9. A device for generating a panoramic surround view image of a vehicle, the device comprising:

an original image acquisition unit configured to acquire actual or training original images of external environment of a first part and a second part of the vehicle hinged to each other;

an independent surround view image acquisition unit, which is coupled to the original image acquisition unit, configured to stitch the actual or training original images of the first part and the second part into respective actual or training independent surround view images; and a panoramic surround view image acquisition unit coupled to a hinge point calibration unit and the independent surround view image acquisition unit, comprising:

a feature point detecting and matching module, which is coupled to the independent surround view image acquisition unit, configured to receive the actual independent surround view images of the first part and the second part, and detect and match feature points therein;

an actual rotation angle calculation module, which is coupled to the feature point detecting and matching module, configured to obtain coordinates of hinge points of the first part and the second part, and overlap the hinge points of the first part and the second part in the independent surround view images, and, assuming that the independent surround view image of the first part is rotated relative to the independent surround view image of the second part or that the matched feature points of the first part are rotated relative to the matched feature points of the second part, calculate a distance between two points in each matched feature point pair to take a matched feature point pair with the distance less than a preset first threshold as a successfully matched feature point pair, and determine an actual rotation angle of the first part relative to the second part at least based on number of the successfully matched feature point pairs; and a panoramic surround view image generation module, which is coupled to the actual rotation angle calculation module, configured to obtain a panoramic surround view image of the vehicle after fusing the respective actual independent surround view images of the first part and the second part according to the coordinates of the hinge points and the actual rotation angle.

10. The device according to claim 9, wherein the actual rotation angle calculation module configured to determine the actual rotation angle of the first part relative to the second part at least based on the number of the successfully matched feature point pairs comprises, taking an angle corresponding to the maximum number of the successfully matched feature point pairs as the actual rotation angle between the first part and the second part.

11. The device according to claim 9, wherein the actual rotation angle calculation module configured to determine the actual rotation angle of the first part relative to the second part at least based on the number of the successfully matched feature point pairs comprises, taking an angle corresponding to the maximum number of the successfully matched feature point pairs as a candidate rotation angle between the first part and the second part, determining coordinates of the successfully matched feature point pair based on the candidate rotation angle, calculating a distance between two points in each successfully matched feature point pair and summing the distances, and taking a rotation angle corresponding to the minimum summation result as the actual rotation angle of the first part relative to the second part.

12. The device according to claim 9, further comprising the hinge point calibration unit coupled to the independent surround view image acquisition unit, which comprises:

a feature point detecting and matching module, which is coupled to the independent surround view image acquisition unit, configured to receive multiple pairs of training independent surround view images of the first part and second part, and to detect and match feature points of each pair of training independent surround view images of the first part and the second part;

a training rotation angle calculation module, which is coupled to the feature point detecting and matching module, configured to obtain a plurality of training rotation-translation matrices between the feature points of the first part and the second part in each pair of training independent surround view images based on the coordinates of the matched feature points, and correspondingly obtain a plurality of training rotation angles between the first part and the second part in each pair of independent surround view images;

a training translation vector acquisition module, which is coupled to the training rotation angle calculation module, configured to determine a plurality of corresponding training translation vectors of each pair of training independent surround view images according to coordinates of the matched feature points of each pair of training independent surround view images and the plurality of training rotation angles; and a hinge point coordinates determination module, which is coupled to the translation vector acquisition module and the training rotation angle calculation module, configured to determine the coordinates of the hinge points of the first part and the second part of the vehicle according to the coordinates of the matched feature points of the multiple pairs of training independent surround view images, the plurality of training rotation angles and the corresponding plurality of training translation vectors.

13. A method for generating a panoramic surround view image of a vehicle, comprising:

acquiring actual original images of external environment of a first part and a second part of the vehicle hinged to each other;

processing the actual original images to obtain respective actual independent surround view images of the first part and the second part;

obtaining coordinates of respective hinge points of the first part and the second part;

determining matched feature point pairs in the actual independent surround view images of the first part and the second part;

overlapping the respective hinge points in the actual independent surround view images of the first part and the second part, and assuming that the independent surround view image of the first part is rotated relative to the independent surround view image of the second part or assuming that matched feature points of the first part are rotated relative to matched feature points of the second part, calculating a distance between two points in each matched feature point pair accordingly, and taking a matched feature point pair with the distance less than a preset first threshold as a successfully matched feature point pair;

determining an actual rotation angle of the first part relative to the second part at least based on number of the successfully matched feature point pairs; and obtaining a panoramic surround view image of the vehicle after fusing the respective actual independent surround view images of the first part and the second part according to the coordinates of the hinge points and the actual rotation angle, wherein said determining an actual rotation angle of the first part relative to the second part at least based on number of the successfully matched feature point pairs comprises:

taking an angle corresponding to the maximum number of the successfully matched feature point pairs as the actual rotation angle between the first part and the second part.

* * * * *